(12) United States Patent
Shapiro et al.

(10) Patent No.: US 7,475,386 B1
(45) Date of Patent: Jan. 6, 2009

(54) MECHANISM FOR DISJOINT INSTRUMENTATION PROVIDERS IN A TRACING FRAMEWORK

(75) Inventors: Michael W. Shapiro, San Francisco, CA (US); Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 970 days.

(21) Appl. No.: 10/713,941

(22) Filed: Nov. 14, 2003

(51) Int. Cl.
*G06F 9/44* (2006.01)
(52) U.S. Cl. ...................... 717/128; 717/130
(58) Field of Classification Search ............... None
See application file for complete search history.

(56) References Cited

U.S. PATENT DOCUMENTS

| | | | | |
|---|---|---|---|---|
| 2002/0199172 | A1* | 12/2002 | Bunnell ............ | 717/128 |
| 2003/0149960 | A1* | 8/2003 | Inamdar ............ | 717/118 |
| 2004/0123279 | A1* | 6/2004 | Boykin et al. ....... | 717/158 |
| 2005/0010930 | A1* | 1/2005 | Vaught ............ | 719/318 |

OTHER PUBLICATIONS

Hollingworth, J.K., Miller, B.P., Goncalves, M.J.R., Naim, O., Xu, Z., Zheng, L. MDL: A Language and Compiler for Dynamic Program Instrumentation. International Conference on Parallel Architectures and Compilation Techniques, San Francisco, Nov. 1997, pp. 201-212.*

DeRose, L., Hoover, T., Jr. Hollingsworth, J.K. The Dynamic Probe Class Library—An Infrastructure for Developing Instrumentation for Performance Tools. Parallel and Distributed Processing Symposium, Proceedings 15th International, Apr. 2001, 7 pages.*

Caubet, J., Gimenez, J., Labarta, J., DeRose, L., Vetter, J. A Dynamic Tracing Mechanism for Performance Analysis of OpenMP Applications, Lecture Notes in Computer Science, vol. 2104, pp. 53-67, 2001.*

Tamches, Ariel and Miller, Barton P. Fine-Grained Dynamic Instrumentation of Commodity Operating System Kernels. [Online] http://www.usenix.org/publications/library/proceedings/osdi99/full_papers/tamches/tamches.pdf, Published Feb. 1999.

Murayama, John. Performance Profiling Using TNF. [Online] http://developers.sun.com/solaris/articles/tnf.html, Jul. 2001.

Lorch, Jacob R., and Smith, Alan J. The VTrace Tool: Building a system Tracer for Windows NT and Windows 2000. [Online] http://msdn.microsoft.com/msdnmag/issues/1000/VTrace/default.aspx, Oct. 2000.

(Continued)

*Primary Examiner*—Tuan Q Dam
*Assistant Examiner*—Cheneca P Smith
(74) *Attorney, Agent, or Firm*—Osha • Liang LLP (57) ABSTRACT

A method for tracing an instrumented program, including associating an instrumentation provider with a trace point to provide a probe in the instrumented program, selectively enabling the probe to obtain an enabled probe, wherein enabling the probe includes defining an action to perform when the enabled probe is fired, firing the enabled probe during execution of the instrumented program, and performing the action when the enabled probe is fired, wherein the action is performed by a tracing framework.

16 Claims, 4 Drawing Sheets

OTHER PUBLICATIONS

Chapter 10. The Generalized Trace Facility (GTF). [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kernist API. http://www.dyninst.org/mtg2003/slides/KerninstAPI.pdf, Apr. 2003.

Richard Moore, et al. IBM Dynamic Probes http://www-124.ibm.com/developerworks/opensource/linux/projects/dprobes/README, 2000.

K. Yaghmour et al.; "Measuring and Characterizing System Behavior Using Kernel-Level Event Logging"; Proceeding of the 2000 USENIX Annual Technical Conference; Jun. 18-23, 2000, San Diego, California, USA.

\* cited by examiner

MECHANISM FOR DISJOINT INSTRUMENTATION PROVIDERS IN A TRACING FRAMEWORK

BACKGROUND

Analyzing the dynamic behavior and performance of a complex software system is difficult. Typically, analysis of a software system is achieved by gathering data at one or more locations of interest within the system and post-processing the data. The following is a brief description of conventional tracing frameworks.

Conventional tracing frameworks are typically composed of various independent software modules. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is an extension to the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred and the CPU identifier for the event.

The primary function of the daemon is to retrieve and store the information accumulated by the trace module, typically in a file. The daemon provides the user with a number of options to control the tracing process. In addition to giving the user access to the options available from the trace module, the daemon allows the user to specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. For example, conventional frameworks that can trace the activities of user processes might record the name and process identifier of each active process prior to tracing so that post-processing analysis and presentation software can print the process name corresponding to a particular process identifier that is saved in a trace data file. The state information is typically retrieved after the configuration of the trace module and prior to the start of the trace. The information retrieved is stored in a file that is later used by the analysis software. Unlike the aforementioned components of the conventional tracing framework described above, the data analysis and presentation software is typically run off-line. The software uses both the initial process state and the trace data files created by the daemon to recreate the dynamic behavior of the system in a particular, observed time interval. Collating and sorting utilities with the software are used to display the stored information at the user-level.

As described above, tracing frameworks typically provide functionality to instrument a program, and functionality to process the data that emanates from the instrumentation. Conventional tracing frameworks have typically integrated the aforementioned functionality. The integration usually involves statically associating the conventional tracing framework, during development, to a specific instrumentation methodology (i.e., a means for instrumenting a program). The integration required the inclusion of platform-specific knowledge to perform the instrumentation.

SUMMARY

In general, in one aspect, the invention relates to a method for tracing an instrumented program, comprising associating an instrumentation provider with a trace point to provide a probe in the instrumented program, selectively enabling the probe to obtain an enabled probe, wherein enabling the probe includes defining an action to perform when the enabled probe is fired, firing the enabled probe during execution of the instrumented program, and performing the action when the enabled probe is fired, wherein the action is performed by a tracing framework.

In general, in one aspect, the invention relates to a system for tracing an instrumented program having a trace point, comprising an instrumentation provider configured to associate the trace point to a probe and to enable the probe, a tracing consumer configured to request that the probe be enabled, wherein the request defines an action to perform when the enabled probe is fired, and a tracing framework configured to forward the request to the instrumentation provider and configured to perform the action, if the probe is enabled.

In general, in one aspect, the invention relates to a network system having a plurality of nodes, comprising an instrumented program having a trace point, an instrumentation provider configured to associate the trace point to a probe and to enable the probe, a tracing consumer configured to request that the probe be enabled, wherein the request defines an action to perform when the enabled probe is fired, and a tracing framework configured to forward the request to the instrumentation provider and configured to perform the action, if the probe is enabled, wherein the instrumented program resides on any node of the plurality of nodes, wherein the instrumentation provider resides on any node of the plurality of nodes, wherein the tracing consumer resides on any node of the plurality of nodes, and wherein the tracing framework resides on any node of the plurality of nodes.

In general, in one aspect, the invention relates to a system for tracing an instrumented program having a probe, comprising a first tracing consumer configured to request that the probe be enabled and perform a first action when fired, a second tracing consumer configured to request that the probe be enabled and perform a second action when fired, and a tracing framework configured to enable the probe in accordance with the first tracing consumer and the second tracing consumer.

Other aspects of the invention will be apparent from the following description and the appended claims.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, the embodiments of the invention relate a method and apparatus for tracing an instrumented program. More specifically, embodiments of the invention provide a means for separating instrumentation of a program from instrumentation data processing. By separating the instrumentation of the program from the instrumentation data processing, instrumentation providers (i.e., sub-systems that instrument the program) do not need to include any knowledge about how to process instrumentation data.

In one embodiment of the invention, a program that is to be instrumented is modified to include one or more trace points. A trace point corresponds to a location in the program with which a probe may be associated with. An instrumentation provider, using one or more methods described below, instruments the trace point (i.e., associates the trace point to the instrumentation provider). Note that the instrumentation provider includes functionality to enable a trace point in a specific manner using a mechanism specific to the instrumentation provider.

At this stage the trace point is now referred to as a probe. Further, the probe is said to be "provided," that is a tracing consumer may request, via a tracing framework, that the instrumentation provider that provided the probe proceed to enable the probe (i.e., patch the probe to call into the tracing framework when the probe is encountered during tracing). The mechanism by which the instrumentation provider enables the probe is typically specific to the instrumentation provider and does not need to be known or understood by the tracing framework. Programs that include one or more probes, as defined above, are referred to as instrumented programs.

Figure 1:
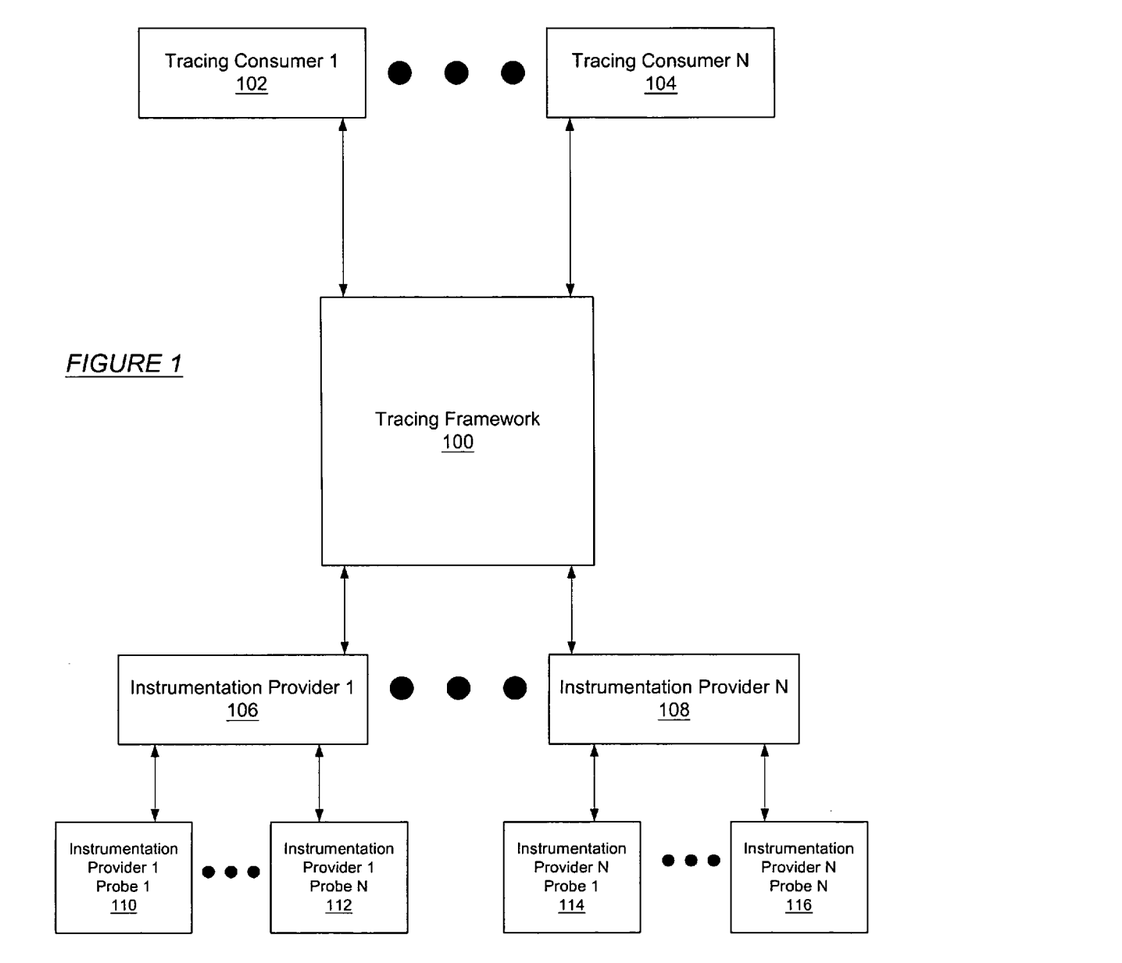
FIG. 1 shows a flow diagram in accordance with one embodiment of the invention.

FIG. 1 shows a flow diagram in accordance with one embodiment of the invention. Specifically, FIG. 1 shows the interaction of the various components with a tracing framework (100) in accordance with one embodiment of the invention. In the embodiment shown in FIG. 1, the tracing framework (100) interacts with one or more tracing consumers (102, 104) and one or more instrumentation providers (106, 108). The instrumentation providers (106, 108) in turn interact with one or more probes (e.g., Instrumentation Provider 1 Probe 1 (110), Instrumentation Provider 1 Probe N (112), Instrumentation Provider N Probe 1 (114), and Instrumentation Provider N Probe N (116)). In one embodiment of the invention, each probe (110, 112, 114, 116) may be associated with only one instrumentation provider (106, 108). Those skilled in the art will appreciate that the aforementioned components as reside on one system. Alternatively, the components may be distributed across a plurality of nodes (i.e., distributed processors) and communicate, for example, via a network.

In one or more embodiments of the invention, the tracing consumer (102, 104) is a virtual client, which defines one or more tracing functions (i.e., defines which of the provided probes to enable and what actions to perform when the probes are encountered during tracing of the instrumented program). The tracing functions are retrieved by the tracing framework (100) and subsequently analyzed to determine which instrumentation providers (106, 108) to forward the requests to. As noted above, the requests to enable probes are forwarded to the instrumentation providers, which provided the probes. The tracing consumer (102, 104) also retrieves the resulting information obtained from perform action the actions requested by the tracing consumer when the enabled probes are encountered during execution of the instrumented program.

In one or more embodiments of the invention, the instrumentation providers (106, 108) include functionality to provide one or more of the following services to the tracing framework (100): 1) provide a probe; 2) enable a probe; 3) disable a probe; and 4) destroy a probe. In addition, the tracing framework (100) may include functionality to provide the following services to an instrumentation provider (106, 108): 1) register a new instrumentation provider (106, 108); 2) unregister an instrumentation provider (106, 108), 3) search for a probe using a probe identifier; 4) create a probe; and 5) fire a probe using a probe identifier. The aforementioned services are described below.

The aforementioned division of services between the instrumentation providers (106, 108) and the tracing framework (100) allows the instrumentation providers (106, 108) to be implemented as dynamic modules that may be loaded and unloaded while the tracing framework (100) remains loaded.

Figure 2:
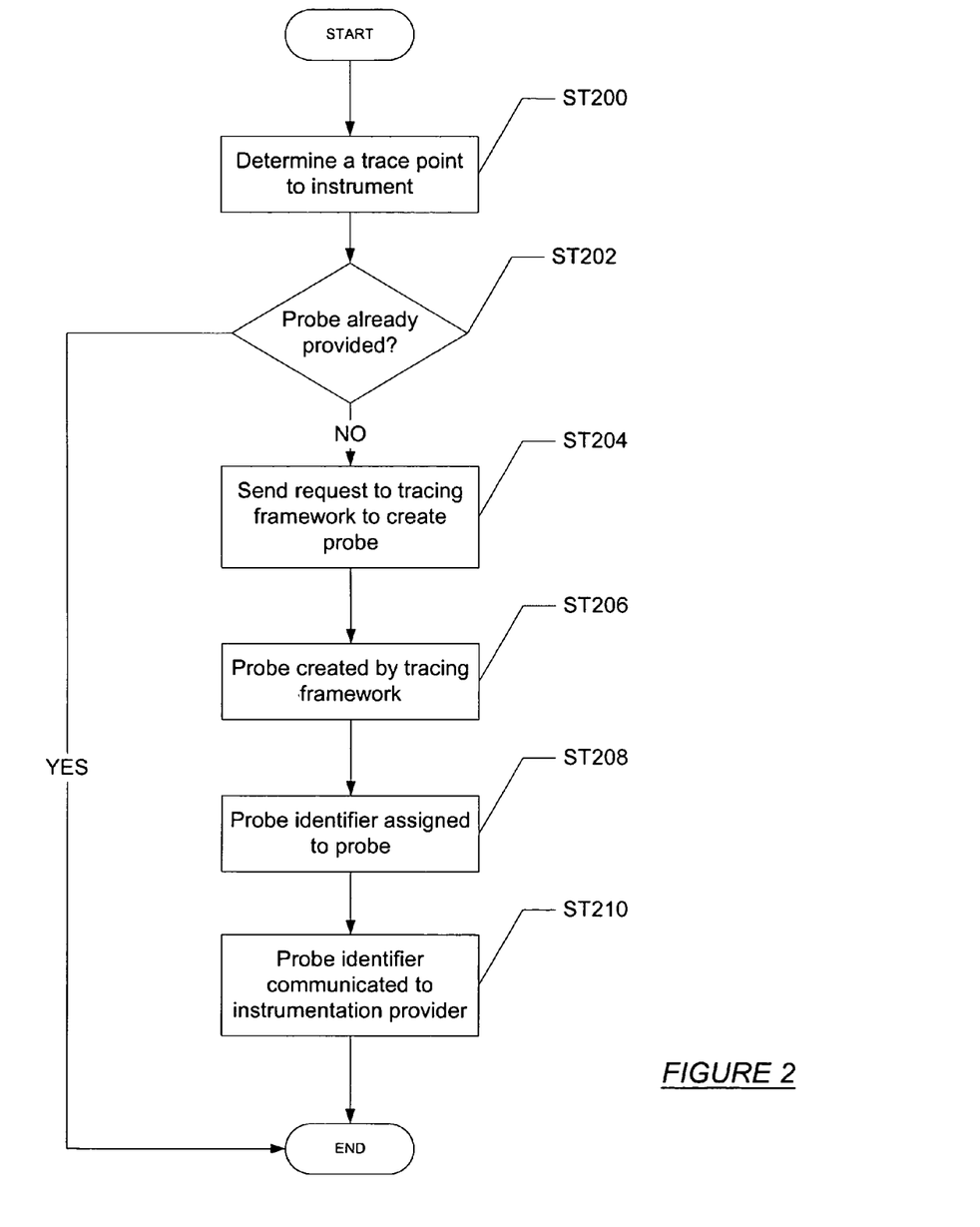
FIG. 2 shows a flowchart in accordance with one embodiment of the invention.

FIG. 2 shows a flowchart in accordance with one embodiment of the invention. More specifically, the FIG. 2 shows a flowchart detailing a method for providing a probe in accordance with one embodiment of the invention. Initially, an instrumentation provider analyzes the trace points within a target program and determines a trace point to instrument (Step 200). The instrumentation provider then determines if the probe is already provided (Step 202). If the probe has already been provided, then instrumentation provider exits the process. Alternatively, if the probe has not been provided, then the instrumentation provider sends a request to the tracing framework to create the probe (i.e., associate it with the instrumentation provider) (Step 204). In one embodiment of the invention, once an instrumentation provider has determined that the probe has not been provided, the instrumentation provider sends a request uniquely specifying the probe that it would like the tracing framework to create.

In one embodiment of the invention, the probe may be uniquely specified using a 4-tuple. The 4-tuple may include the following components {<provider>, <module>, <function>, <name>}. The <provider> component corresponds to the name of the instrumentation provider that is providing this probe (e.g., the name of tracing framework module, which enables the probe. The <module> component corresponds to the name of a module in which the probe is located (i.e., the name of a user library). The <function> component corresponds to the name of the program function in which the probe is located. The <name> component corresponds to a user-defined name that may provide an indication of the probe's function, location, etc. The aforementioned 4-tuple used to specify the probe provides an efficient means to prevent namespace conflicts between the disjoint instrumentation providers.

Continuing with the discussion of FIG. 2, the tracing framework receives the request and subsequently creates the probe (Step 206). Once the tracing framework has created the probe, the tracing framework assigns a unique identifier to the probe (e.g., a probe identifier) (Step 208). Note, the probe identifier may be used to refer to the probe by any process operating in/or associated with the tracing framework. The probe identifier is then communicated to the instrumentation provider (Step 210). Upon completion of the process, the probe is said to be "provided" and, accordingly, may now be enabled by the instrumentation provider upon request of a tracing consumer.

In one or more embodiments of the invention, probes are provided using the aforementioned method, or a variant thereof, when an instrumentation provider registers with the tracing framework or when the program being instrumented changes in a way that allows the instrumentation provider(s) to provide additional probes. For example, if a new module of the software being instrumented is loaded, instrumentation providers may wish to provide new probes in the new module. Note that instrumentation providers are typically registered when they are loaded into a system executing the tracing framework and associated with the tracing framework.

As noted above, once a probe is provided (i.e., associated with a probe identifier), one or more tracing consumers may send a request to the tracing framework to enable one or more probes. In one embodiment of the invention, all probes are initially disabled when they are first provided.

Figure 3:
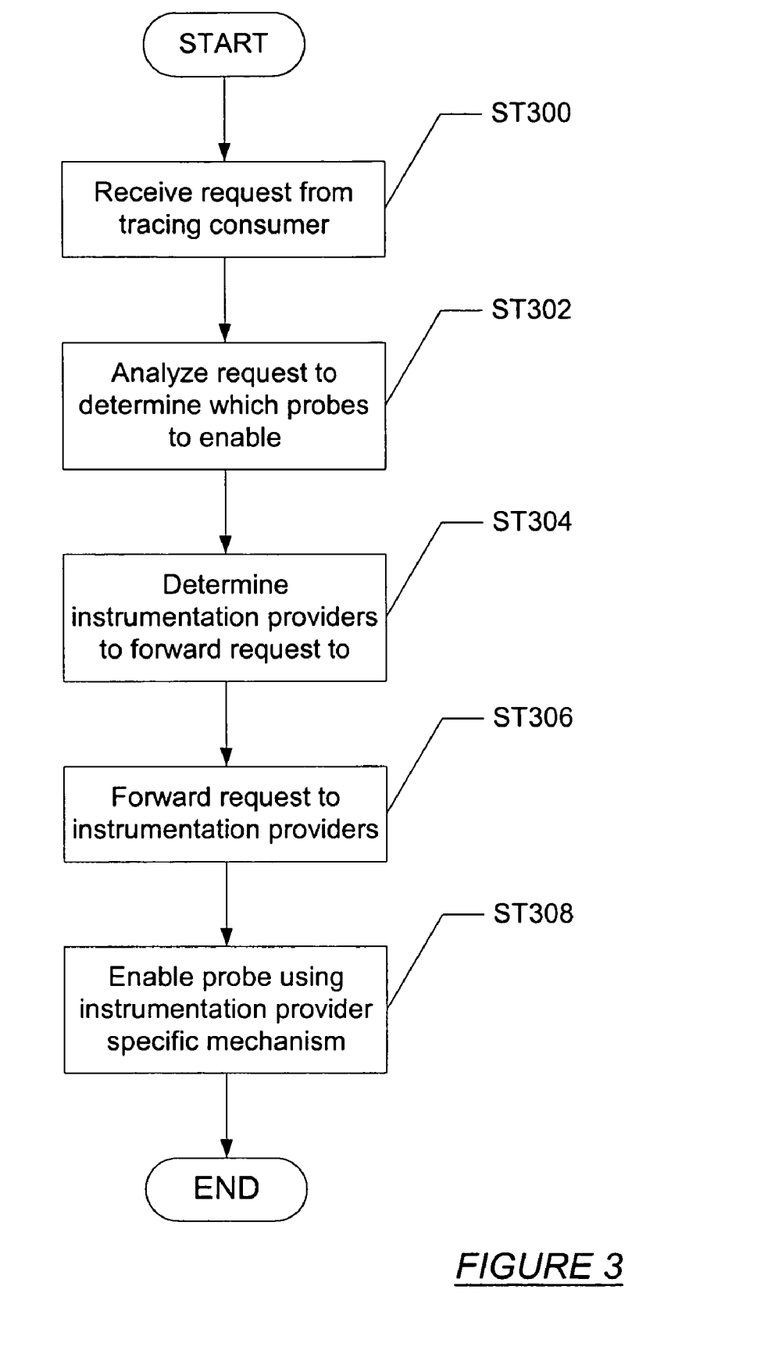
FIG. 3 shows a flowchart in accordance with one embodiment of the invention.

FIG. 3 shows flowchart in accordance with one embodiment of the invention. More specifically, FIG. 3 shows a method for enabling a probe in accordance with one embodiment of the invention. Initially, a request is received by the tracing framework from a tracing consumer (Step 300). The tracing framework analyzes the request and determines which probes the tracing consumer requested to be enabled (Step 302). In one embodiment of the invention, the request from tracing consumer specifies which probes to enable using the 4-tuple described above. The tracing framework subsequently uses the 4-tuple to determine which instrumentation providers to forward the request to (Step 304).

The request (or portions of the request) are forwarded to the appropriate instrumentation provider(s) (Step 306). The instrumentation providers enable the probe using mechanisms specific to the instrumentation provider (Step 308). More specifically, the instrumentation provider(s) perform(s) the necessary steps to assure that control flow is transferred into the tracing framework at the point indicated by the probe when a thread executing the instrumented program encounters the probe. Once the probe has been enabled, the tracing framework assumes that the instrumentation provider has taken the necessary steps to ensure the probe fires as requested.

In the case where more than one consumer requests that a particular probe be enabled, the tracing framework handles the multiplexing of tracing consumers to the probe. Accordingly, a given probe provided by an instrumentation provider may be enabled by one or more tracing consumers and each tracing consumer may enable the probe in a different manner. Thus, a first consumer may enable the probe and require that a first action be performed when the probe is encountered, and a second tracing consumer may enable the probe and require that a second action be performed when the probe is encountered. In addition, one tracing consumer may enable a given probe in one or more ways. Note that the tracing framework typically performs the action(s) associated with a given probe, as specified by the tracing consumer, when the probe is fired.

In one or more embodiments of the invention, when a thread executing the instrumented program encounters a probe, a trap handler (or a related process handling the probe) calls into the tracing framework, specifying the probe identifier. The particular mechanism (e.g., using a trap handler) for calling into the tracing framework is dictated by the instrumentation provider and the system architecture (e.g., a stack-based architecture, delay slot architecture, etc.) upon which the instrumented program is running. The tracing framework performs the actions, as requested by the tracing consumers, saves the resulting information in an associated buffer, and then returns control to the thread via the trap handler. In one or more embodiments of the invention, the tracing framework uses the probe identifier to look-up the probe and associated probe data structures in the tracing framework that are subsequently used to perform the actions requested by the tracing consumer. Note that the instrumentation providers determine the exact manner in which a given probe is instrumented and subsequently handled outside the tracing framework.

In one embodiment of the invention, a probe is disabled when the number of tracing consumers enabling the probe drops to zero. At this time, the tracing framework calls into the appropriate instrumentation provider to disable the probe. The instrumentation provider then takes the necessary steps to ensure that the probe will not fire when it is encountered by a thread executing the instrumented program.

In one embodiment of the invention, all of the probes associated with an instrumentation provider are removed when the instrumentation provider unregisters with the tracing framework. In one embodiment of the invention, if any of the probes associated with an instrumentation provider that is attempting to unregister are enabled, the tracing framework does not allow the instrumentation provider to unregister. Instrumentation providers are typically unregistered when they are unloaded from the system executing the tracing framework. Note that in some implementations of the invention, if the unregistration operation fails, the unloading operation of the instrumentation provider also fails, with an error indicating that the instrumentation provider is busy.

Figure 4:
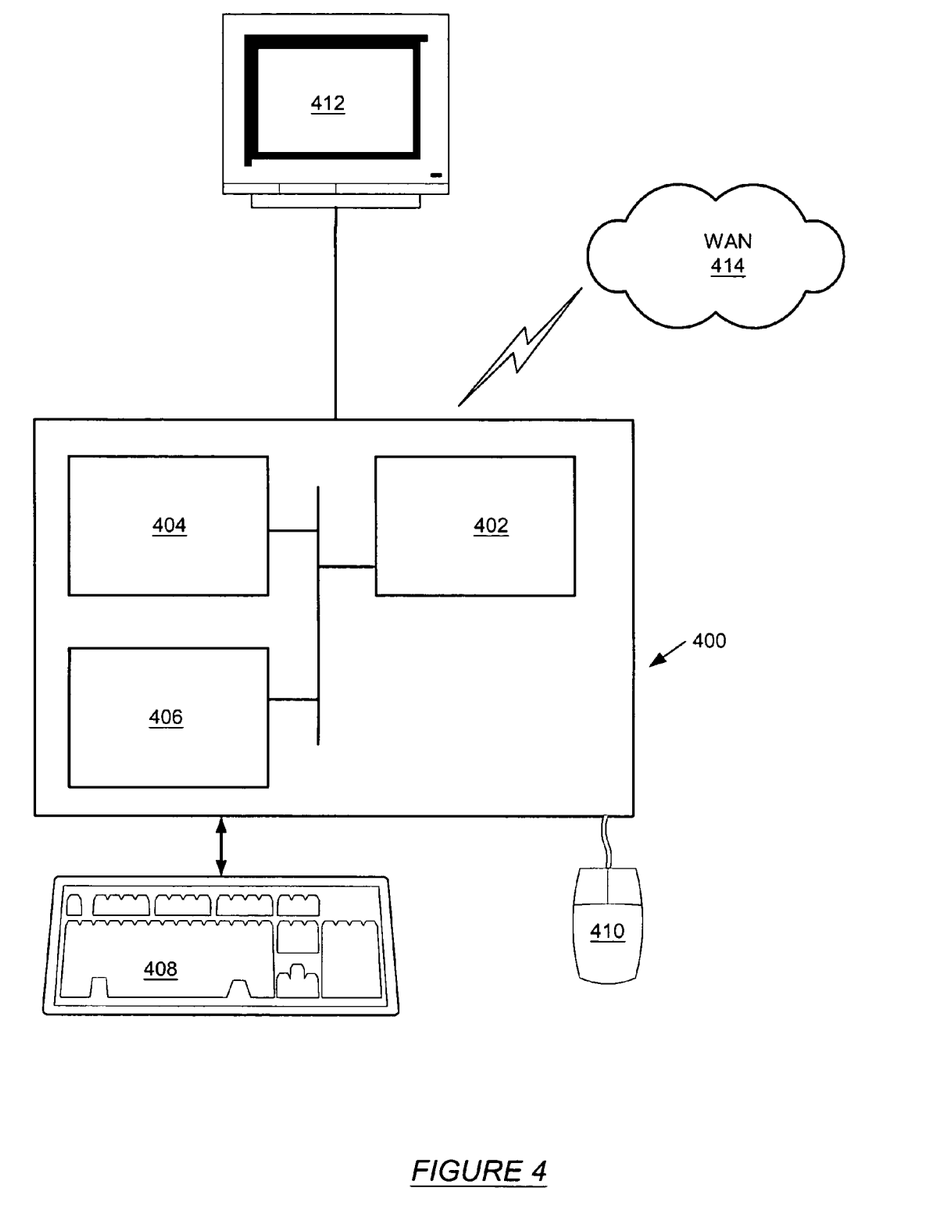
FIG. 4 shows a networked computer system in accordance with one embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (414) (e.g., the Internet) via a network interface connection (not shown). Those skilled in the art will appreciate that these input and output means may take other forms. Those skilled in the art will appreciate that one or more elements of the aforementioned computer (400) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing an instrumented program, comprising:
    registering an instrumentation provider with a tracing framework;
    associating the instrumentation provider with a trace point to provide a probe in the instrumented program;
    selectively enabling the probe to obtain an enabled probe in response to a request from a first tracing consumer; and,
        wherein enabling the probe comprises assuring that control flow is transferred to the tracing framework when the enabled probe is fired,
        wherein enabling the probe is performed using a mechanism specific to the instrumentation provider, and
        wherein the probe is enabled for a plurality of multiplexed tracing consumers and different actions are associated with the probe for each of the plurality of multiplexed tracing consumers;
    firing the enabled probe during execution of the instrumented program;
    transferring control flow to the tracing framework when the enabled probe is fired, wherein transferring control flow to the tracing framework is performed using the mechanism specific to the instrumentation provider; and
    performing a first action associated with the probe for the first tracing consumer selected from the plurality of multiplexed tracing consumers; and
    performing a second action associated with the probe for a second tracing consumer selected from the plurality of multiplexed tracing consumers,
    wherein the first action and the second action are performed by the tracing framework after control flow is transferred to the tracing framework.

2. The method of claim 1, wherein the request comprises a tuple having a provider component, a module component, a function component, and a name component.

3. The method of claim 1, further comprising:
    disabling the enabled probe if no tracing consumer of the plurality of multiplexed tracing consumers is requesting the enabled probe.

4. The method of claim 1, further comprising:
    removing the probe when the instrumentation provider that provided the probe is unregistered.

5. The method of claim 1, wherein associating the instrumentation provider with the trace point comprises:
    determining whether the probe is currently provided at the trace point;
    requesting the tracing framework to create the probe if the probe is not currently provided at the trace point; and
    generating a probe identifier associated with the probe.

6. The method of claim 1, wherein transferring control flow to the tracing framework comprises calling the tracing framework using a probe identifier associated with the enabled probe.

7. A system for tracing an instrumented program having a trace point, comprising:
    a processor;
    a memory associated with the processor;
    a tracing framework resident in the memory and executing under control of the processor;
    an instrumentation provider resident in the memory and executing under control of the processor; and
    a tracing consumer resident in the memory and executing under control of the processor,
    wherein the instrumentation provider is configured to associate the trace point to a probe and to enable the probe,
        wherein enabling the probe comprises assuring that control flow is transferred to the tracing framework when the enabled probe is fired,
        wherein enabling the probe is performed using a mechanism specific to the instrumentation provider, and
        wherein the probe is enabled for a plurality of multiplexed tracing consumers and different actions are associated with the probe for each of the plurality of multiplexed tracing consumers,
    wherein the tracing consumer is configured to request that the probe be enabled, wherein the request defines a first action and a second action to perform when the enabled probe is fired, wherein the first action is associated with a first tracing consumer selected from the plurality of multiplexed tracing consumers and the second action is associated with a second tracing consumer selected from the plurality of multiplexed tracing consumers, and
    wherein the tracing framework is configured to:
        register the instrumentation provider,
        forward the request to the instrumentation provider, and
        perform the first action and the second action after control flow is transferred to the tracing framework using the mechanism specific to the instrumentation provider.

8. The system of claim 7, wherein the tracing framework is further configured to create the probe.

9. The system of claim 8, wherein creating the probe comprises assigning a probe identifier to the probe.

10. The system of claim 7, wherein associating the trace point to the probe comprises:
    determining whether the probe is currently provided at the trace point;
    requesting the tracing framework to create the probe if the probe is not currently provided at the trace point; and
    generating a probe identifier associated with the probe.

11. The system of claim 7, wherein the request comprises a tuple having a name component, a module component, a function component, and a name component.

12. The system of claim 1, wherein the tracing framework is provided with a probe identifier when the probe is fired.

13. The system of claim 7, wherein the tracing framework is configured to unregister the instrumentation provider when the instrumentation provider is unloaded.

14. A network system having a plurality of nodes, comprising:
    an instrumented program having a trace point;
    a tracing framework;
    a tracing consumer; and
    an instrumentation provider configured to associate the trace point to a probe and to enable the probe,
        wherein enabling the probe comprises assuring that control flow is transferred to the tracing framework when the enabled probe is fired,
        wherein enabling the probe is performed using a mechanism specific to the instrumentation provider, and
        wherein the probe is enabled for a plurality of multiplexed tracing consumers and different actions are associated with the probe for each of the plurality of multiplexed tracing consumers,
    wherein the tracing consumer is configured to request that the probe be enabled, wherein the request defines a first action and a second action to perform when the enabled probe is fired, wherein the first action is associated with a first tracing consumer selected from the plurality of multiplexed tracing consumers and the second action is associated with a second tracing consumer selected from the plurality of multiplexed tracing consumers, wherein the tracing framework is configured to:
register the instrumentation provider,
forward the request to the instrumentation provider, and
perform the first action and the second action after control flow is transferred to the tracing framework using the mechanism specific to the instrumentation provider, wherein the instrumented program resides on any node of the plurality of nodes, wherein the instrumentation provider resides on any node of the plurality of nodes, wherein the tracing consumer resides on any node of the plurality of nodes, and wherein the tracing framework resides on any node of the plurality of nodes.

15. A computer storage device comprising instructions for enabling a computer system, under control of a processor, to perform a method for tracing an instrumented program, wherein the method comprises:

registering an instrumentation provider with a tracing framework;

associating the instrumentation provider with a trace point to provide a probe in the instrumented program;

selectively enabling the probe to obtain an enabled probe in response to a request from a first tracing consumer; and, wherein enabling the probe comprises assuring that control flow is transferred to the tracing framework when the enabled probe is fired, wherein enabling the probe is performed using a mechanism specific to the instrumentation provider, and wherein the probe is enabled for a plurality of multiplexed tracing consumers and different actions are associated with the probe for each of the plurality of multiplexed tracing consumers;

firing the enabled probe during execution of the instrumented program;

transferring control flow to the tracing framework when the enabled probe is fired, wherein transferring control flow to the tracing framework is performed using the mechanism specific to the instrumentation provider; and performing a first action associated with the probe for the first tracing consumer selected from the plurality of multiplexed tracing consumers; and performing a second action associated with the probe for a second tracing consumer selected from the plurality of multiplexed tracing consumers, wherein the first action and the second action are performed by the tracing framework after control flow is transferred to the tracing framework.

16. The method of claim 1, wherein the instrumentation provider is a dynamic module, and wherein registering the instrumentation provider is performed when the tracing framework is already loaded.

* * * * *